United States Patent
Emery et al.

(10) Patent No.: US 10,343,731 B2
(45) Date of Patent: Jul. 9, 2019

(54) SKIRT SYSTEM MOUNT BRACKET ASSEMBLY

(71) Applicant: WABASH NATIONAL, L.P., Lafayette, IN (US)

(72) Inventors: Aaron Emery, Lafayette, IN (US); Michael J. Courtney, Dayton, IN (US)

(73) Assignee: Wabash National, L.P., Lafayette, IN (US)

( * ) Notice: Subject to any disclaimer, the term of this patent is extended or adjusted under 35 U.S.C. 154(b) by 37 days.

(21) Appl. No.: 15/716,672

(22) Filed: Sep. 27, 2017

(65) Prior Publication Data

US 2018/0093719 A1 Apr. 5, 2018

Related U.S. Application Data

(60) Provisional application No. 62/402,234, filed on Sep. 30, 2016.

(51) Int. Cl.
*B60J 9/00* (2006.01)
*B62D 35/00* (2006.01)
*B62D 24/00* (2006.01)

(52) U.S. Cl.
CPC ........... *B62D 35/008* (2013.01); *B62D 24/00* (2013.01); *B62D 35/001* (2013.01)

(58) Field of Classification Search
CPC ......... A47B 88/43; F16M 13/02; F24S 25/61; Y02E 10/47; E04B 1/40; B62D 35/001; B62D 35/008; B62D 35/02; B62D 25/168; Y10S 180/903
USPC .......................................... 296/180.1, 180.4
See application file for complete search history.

(56) References Cited

U.S. PATENT DOCUMENTS

| | | | |
|---|---|---|---|
| 357,800 | A | 2/1887 | Wescott |
| 495,801 | A | 4/1893 | Henthorne |
| 564,027 | A | 7/1896 | Pratt |
| 824,541 | A | 6/1906 | Hager et al. |
| 1,127,241 | A | 2/1915 | Hawksworth |
| 2,318,863 | A | 5/1943 | Jabelmann |
| 2,737,411 | A | 3/1956 | Potter |

(Continued)

FOREIGN PATENT DOCUMENTS

| | | |
|---|---|---|
| CA | 2651688 A1 | 7/2009 |
| CA | 2715304 A1 | 3/2011 |

(Continued)

OTHER PUBLICATIONS

Office action in U.S. Appl. No. 13/413,998 dated Nov. 2, 2012 (9 pages).

(Continued)

*Primary Examiner* — Kiran B Patel
(74) *Attorney, Agent, or Firm* — Quarles & Brady LLP

(57) ABSTRACT

A mount bracket assembly for a skirt system of a trailer is disclosed. The mount bracket assembly includes a channel mount configured to be coupled to a portion of the skirt system and an attachment assembly configured to be coupled to a flange of a cross-member of the trailer. The attachment assembly includes a top wall coupled to the channel mount and a mounting bracket fixed to the top wall, the mounting bracket including two hook-shaped portions separated by a planar portion, wherein the two hook-shaped portions are each sized and configured to fit over the flange.

11 Claims, 11 Drawing Sheets

(56) References Cited

U.S. PATENT DOCUMENTS

| | | | |
|---|---|---|---|
| 3,256,655 A | 6/1966 | Teter | |
| 3,401,953 A | 9/1968 | Prohl et al. | |
| 3,483,939 A | 12/1969 | Maddock et al. | |
| 3,608,928 A | 9/1971 | Hooker | |
| 3,711,146 A | 1/1973 | Madzsar et al. | |
| 3,852,965 A | 12/1974 | Rudd | |
| 3,859,797 A | 1/1975 | Ayers | |
| 4,006,932 A | 2/1977 | McDonald | |
| 4,045,962 A | 9/1977 | Preus | |
| 4,060,268 A * | 11/1977 | Page, Jr. | B60R 19/565 293/128 |
| 4,103,918 A | 8/1978 | Salden | |
| 4,104,884 A | 8/1978 | Preus | |
| 4,142,755 A | 3/1979 | Keedy | |
| 4,190,381 A | 2/1980 | Knaus et al. | |
| 4,236,745 A | 12/1980 | Davis | |
| 4,262,961 A | 4/1981 | Schmidt | |
| 4,282,946 A | 8/1981 | MacGuire | |
| 4,352,502 A | 10/1982 | Leonard et al. | |
| 4,421,333 A | 12/1983 | Van Dyke | |
| 4,611,847 A | 9/1986 | Sullivan | |
| 4,688,824 A | 8/1987 | Herring | |
| 4,746,160 A | 5/1988 | Wiesemeyer | |
| 4,943,204 A | 7/1990 | Ehrlich | |
| 5,058,945 A | 10/1991 | Elliott, Sr. et al. | |
| 5,094,744 A | 3/1992 | Scovell | |
| 5,152,228 A | 10/1992 | Donkin | |
| 5,280,990 A * | 1/1994 | Rinard | B62D 35/001 296/180.1 |
| D354,726 S | 1/1995 | Fitzgerald et al. | |
| 5,489,137 A | 2/1996 | Herrmeyer | |
| 5,607,200 A | 3/1997 | Smidler | |
| 5,673,953 A | 10/1997 | Spease | |
| 5,823,610 A | 10/1998 | Ryan | |
| 5,921,617 A * | 7/1999 | Loewen | B62D 33/027 296/180.4 |
| 6,079,769 A | 6/2000 | Fannin et al. | |
| 6,092,861 A | 7/2000 | Whelan | |
| 6,109,675 A | 8/2000 | Sumrall | |
| 6,116,667 A | 9/2000 | Torcomian | |
| 6,227,487 B1 * | 5/2001 | Clark | B64C 5/08 244/99.12 |
| 6,257,654 B1 | 7/2001 | Boivin et al. | |
| 6,286,894 B1 | 9/2001 | Kingham | |
| 6,309,010 B1 | 10/2001 | Whitten | |
| 6,409,252 B1 | 6/2002 | Andrus | |
| 6,443,492 B1 | 9/2002 | Barr et al. | |
| 6,467,833 B1 | 10/2002 | Travers | |
| 6,485,087 B1 | 11/2002 | Roberge et al. | |
| 6,595,578 B1 | 7/2003 | Calsoyds et al. | |
| 6,626,475 B2 | 9/2003 | Schroeder | |
| 6,644,720 B2 | 11/2003 | Long et al. | |
| 6,652,010 B1 * | 11/2003 | Huddle | B60R 19/56 293/102 |
| 6,666,498 B1 | 12/2003 | Whitten | |
| 6,799,791 B2 | 10/2004 | Reiman et al. | |
| 6,837,536 B1 | 1/2005 | Schwartz | |
| 6,893,079 B1 | 5/2005 | Johnson et al. | |
| 6,915,611 B2 | 7/2005 | Reiman et al. | |
| 6,959,958 B2 | 11/2005 | Basford | |
| 6,974,166 B2 | 12/2005 | Ledford et al. | |
| 6,974,178 B2 | 12/2005 | Ortega et al. | |
| 7,059,819 B2 | 6/2006 | Brackmann et al. | |
| 7,086,674 B2 | 8/2006 | Goetz | |
| 7,093,889 B2 | 8/2006 | Graham | |
| 7,134,820 B2 | 11/2006 | Ehrlich | |
| 7,147,270 B1 | 12/2006 | Andrus et al. | |
| 7,163,258 B2 | 1/2007 | Dyer, II et al. | |
| 7,188,875 B2 * | 3/2007 | Norelius | B60R 13/00 293/118 |
| 7,347,154 B2 | 3/2008 | Evans | |
| 7,404,592 B2 | 7/2008 | Reiman et al. | |
| 7,407,204 B2 | 8/2008 | Eriksson et al. | |
| 7,431,381 B2 | 10/2008 | Wood | |
| 7,497,502 B2 | 3/2009 | Wood | |
| 7,537,270 B2 | 5/2009 | O'Grady | |
| 7,578,541 B2 | 8/2009 | Layfield et al. | |
| 7,604,284 B2 | 10/2009 | Reiman et al. | |
| 7,665,716 B2 | 2/2010 | Reast | |
| 7,686,385 B2 | 3/2010 | Dolan et al. | |
| 7,740,303 B2 | 6/2010 | Wood | |
| 7,748,772 B2 | 7/2010 | Boivin et al. | |
| 7,780,224 B2 | 8/2010 | Roush | |
| 7,837,254 B2 | 11/2010 | Reiman et al. | |
| 7,877,120 B2 | 2/2011 | Boivin et al. | |
| 7,938,475 B2 | 5/2011 | Boivin et al. | |
| 7,942,466 B2 | 5/2011 | Reiman et al. | |
| 7,942,467 B2 | 5/2011 | Boivin et al. | |
| 7,942,468 B2 | 5/2011 | Boivin et al. | |
| 7,942,469 B2 | 5/2011 | Boivin et al. | |
| 7,942,470 B2 | 5/2011 | Boivin et al. | |
| 7,942,471 B2 | 5/2011 | Boivin et al. | |
| 7,950,721 B1 | 5/2011 | Peterson | |
| 7,967,349 B2 | 6/2011 | Puppini et al. | |
| 8,162,384 B2 | 4/2012 | Giromini et al. | |
| 8,177,286 B2 | 5/2012 | Brown et al. | |
| 8,191,956 B1 * | 6/2012 | Dixon, Jr. | B62D 35/001 296/180.4 |
| 8,210,599 B2 | 7/2012 | Butler | |
| 8,303,025 B2 | 11/2012 | Senatro | |
| 8,382,194 B2 | 2/2013 | Wood | |
| 8,398,150 B2 | 3/2013 | Brown et al. | |
| 8,408,570 B2 | 4/2013 | Heppel et al. | |
| 8,496,286 B1 | 7/2013 | Katz et al. | |
| 8,579,359 B2 | 11/2013 | Brown et al. | |
| 8,616,616 B2 | 12/2013 | Van Raemdonck | |
| 8,727,425 B1 * | 5/2014 | Senatro | B62D 35/001 296/180.4 |
| 8,783,758 B2 | 7/2014 | Baker | |
| 8,801,078 B2 | 8/2014 | Brown et al. | |
| 8,857,893 B2 | 10/2014 | Reiman et al. | |
| 8,899,660 B1 | 12/2014 | Praskovskaya et al. | |
| 8,973,973 B2 | 3/2015 | Kronemeyer | |
| 8,979,172 B2 | 3/2015 | Reiman et al. | |
| 8,985,677 B2 | 3/2015 | Wiegel | |
| 9,004,575 B2 | 4/2015 | Grandominico et al. | |
| 9,027,983 B2 * | 5/2015 | Butler | B62D 25/188 296/180.4 |
| 9,045,176 B1 | 6/2015 | Henderson, II | |
| 9,139,241 B1 | 9/2015 | Smith | |
| 9,199,673 B2 | 12/2015 | Baker | |
| 9,199,676 B2 | 12/2015 | Brown et al. | |
| 9,211,919 B2 | 12/2015 | Senatro | |
| 9,248,872 B2 * | 2/2016 | White | B62D 35/001 |
| 9,296,433 B2 | 3/2016 | Roush | |
| 9,308,949 B1 | 4/2016 | Mihelic et al. | |
| 9,463,759 B1 * | 10/2016 | Kiefer | B60R 19/565 |
| 9,567,016 B2 | 2/2017 | Magee | |
| D818,415 S * | 5/2018 | Haws | D12/223 |
| 9,957,991 B2 * | 5/2018 | Mancina | B62D 35/001 |
| 2003/0178611 A1 | 9/2003 | Anderson | |
| 2005/0040637 A1 | 2/2005 | Wood | |
| 2005/0067204 A1 | 3/2005 | Rijsbergen et al. | |
| 2005/0115776 A1 | 6/2005 | Doerflinger et al. | |
| 2005/0161976 A1 | 7/2005 | Ortega et al. | |
| 2006/0152038 A1 * | 7/2006 | Graham | B60R 19/565 296/180.1 |
| 2006/0182580 A1 | 8/2006 | Peterson | |
| 2007/0114757 A1 | 5/2007 | Vickroy | |
| 2007/0120397 A1 | 5/2007 | Laytield et al. | |
| 2007/0176466 A1 * | 8/2007 | Dolan | B62D 35/001 296/203.03 |
| 2008/0061597 A1 | 3/2008 | Reiman et al. | |
| 2008/0061598 A1 | 3/2008 | Reiman et al. | |
| 2008/0093887 A1 | 4/2008 | Wood | |
| 2008/0116702 A1 | 5/2008 | Enz et al. | |
| 2009/0189414 A1 * | 7/2009 | Boivin | B62D 35/001 296/180.4 |
| 2009/0212595 A1 | 8/2009 | Heppel et al. | |
| 2009/0212596 A1 | 8/2009 | Reiman et al. | |
| 2009/0218848 A1 | 9/2009 | Boivin et al. | |
| 2010/0096880 A1 | 4/2010 | Boivin et al. | |
| 2010/0096881 A1 | 4/2010 | Boivin et al. | |

(56) References Cited

U.S. PATENT DOCUMENTS

| | | |
|---|---|---|
| 2010/0096882 A1 | 4/2010 | Boivin et al. |
| 2010/0096883 A1 | 4/2010 | Boivin et al. |
| 2010/0098481 A1 | 4/2010 | Boivin et al. |
| 2010/0231000 A1 | 9/2010 | Andrus et al. |
| 2010/0264690 A1 | 10/2010 | Brown et al. |
| 2010/0264691 A1 | 10/2010 | Giromini |
| 2011/0025092 A1 | 2/2011 | Reimen et al. |
| 2011/0062749 A1* | 3/2011 | Graham ............... B62D 35/001 296/180.4 |
| 2011/0148142 A1 | 6/2011 | Kint |
| 2011/0175396 A1 | 7/2011 | Boivin et al. |
| 2011/0204677 A1 | 8/2011 | Wood et al. |
| 2011/0285167 A1 | 11/2011 | Butler |
| 2012/0074728 A1* | 3/2012 | Senatro ............... B62D 35/001 296/180.4 |
| 2012/0091754 A1 | 4/2012 | Lee et al. |
| 2012/0169086 A1 | 5/2012 | Giromini |
| 2012/0200113 A1 | 8/2012 | Brown et al. |
| 2012/0235441 A1 | 9/2012 | Dayton |
| 2012/0319428 A1 | 12/2012 | Wood |
| 2013/0119701 A1* | 5/2013 | Dayton ................. B62D 35/02 296/180.4 |
| 2013/0181477 A1* | 7/2013 | Reiman ............... B62D 35/001 296/180.4 |
| 2013/0270857 A1 | 10/2013 | Brown et al. |
| 2013/0285411 A1 | 10/2013 | Layfield et al. |
| 2014/0035318 A1 | 2/2014 | Brown et al. |
| 2014/0252799 A1* | 9/2014 | Smith .................. B62D 35/001 296/180.4 |
| 2014/0300134 A1* | 10/2014 | Gerst ................... B62D 35/001 296/180.4 |
| 2014/0333089 A1 | 11/2014 | Brown et al. |
| 2014/0159419 A1 | 12/2014 | Baker |
| 2015/0076860 A1* | 3/2015 | Rettig ................. B62D 35/001 296/180.5 |
| 2015/0197291 A1* | 7/2015 | Roush ................. B62D 35/001 280/423.1 |
| 2015/0259014 A1* | 9/2015 | Baker .................. B62D 35/001 296/180.4 |
| 2016/0096558 A1* | 4/2016 | Bassily ............... B62D 35/001 296/180.4 |
| 2016/0121940 A1* | 5/2016 | Courtney ............ B62D 35/001 296/180.4 |
| 2016/0244108 A1 | 8/2016 | Tsuruta et al. |
| 2017/0029044 A1* | 2/2017 | Senatro ............... B62D 35/001 |
| 2017/0057563 A1* | 3/2017 | Baker .................. B62D 35/001 |
| 2017/0066487 A1* | 3/2017 | Boivin ................. B62D 35/001 |
| 2017/0174271 A1* | 6/2017 | Baker .................. B62D 35/001 |
| 2017/0217506 A1* | 8/2017 | Bezner ................ B62D 35/001 |
| 2017/0274942 A1* | 9/2017 | Boivin ................. B62D 35/001 |
| 2018/0043944 A1* | 2/2018 | Magee ................. B62D 35/001 |
| 2018/0118143 A1* | 5/2018 | Ponder ................ B62D 35/001 |
| 2018/0244228 A1* | 8/2018 | Desjardins ........... B60R 19/565 |
| 2018/0304941 A1* | 10/2018 | Ehrlich ................ B62D 35/001 |
| 2018/0370580 A1* | 12/2018 | Butler ................. B62D 35/001 |
| 2019/0031251 A1* | 1/2019 | Butler ................. B62D 35/001 |

FOREIGN PATENT DOCUMENTS

| | | |
|---|---|---|
| CA | 2810007 A1 | 9/2013 |
| CA | 2812316 A1 | 10/2013 |
| CA | 2860351 A1 | 2/2015 |
| CA | 2905596 A1 | 4/2016 |
| EP | 0738621 A1 | 10/1996 |
| EP | 0857620 A1 | 8/1998 |
| JP | 2007223359 A | 9/2007 |
| KR | 20110059021 A | 6/2011 |
| NL | 1034363 C2 | 2/2009 |
| WO | 97/48590 A1 | 12/1997 |
| WO | 03/093066 A1 | 11/2003 |

OTHER PUBLICATIONS

AeroFlex Fairing™ product info Page (1 page), Jul. 7, 2010.
AeroFlex Belly Fairing™ product info Page (2 pages), Jul. 7, 2010.
AeroFlex Low Rider Belly Fairing product info Page (1 page), Jul. 7, 2010.
AeroFlex Freight Wing Chassis Belly Fairing product info page (1 page) Jul. 7, 2010.
Trailer Fairings from http://www.laydoncomp.cm/trailer-skirts.php (3 pages), Jul. 7, 2010.
Trailerskirt™ Assembly Instructions, Jun. 12, 2009 REV. 8.0 supersedes all other version, LCL-ENG-045, (7 pages).
"MFS Skirt, Maximum Flex Skirt", Transtech Composite, (2 pages), undated material.
Side Skirt Fairing: Overview: "Aeroefficient-Aerodynamic Solution for the Trucking Industry", 2010 Aeroefficient (12 pages).
Truck Fuel Savings, Aerodynamic Fairing, Aerodynamic Parts, Truck Industry "WINDYNE", (2 pages) Jul. 7, 2010.
Laydon Composites, LTD website Trailer Skirt Catalog as existed on Feb. 7, 2009, accessed via the internet ArcheiveWayBack Machine on Oct. 3, 2011, found at http://web.srchive.org/web/20090207195226/http:/www.laydoncormp.com/trailer-skirts.php (3 pages).
2009 Product catalog for Takler Srl (31 pages).
The International Search Report and the Written Opinion of the International Searching Authority for related International Application No. PCT/US2010/031173, dated Jun. 14, 2010 (13 pages).
Strehl Trailer Blade Brochure, Trailer Blade™ Model 715 Advance Aerodynamic Trailer Skirt, (5 pages), Apr. 20, 2011.
Utility Brochure, Innovative Side Skirt Designs From Utility, (2 pages) 2010.
Office Action in U.S. Appl. No. 12/760,798 dated Oct. 13, 2011 (12 pages).
Office Action in U.S. Appl. No. 13/448,931 dated Jun. 29, 2012 (12 pages).
Office action in U.S. Appl. No. 14/923,610 dated Aug. 31, 2016 (7 pages).
Office action in U.S. Appl. No. 13/413,998 dated Jul. 10, 2012 (9 pages).
Office action in U.S. Appl. No. 13/741,639 dated Apr. 5, 2013 (11 pages).
Office action in U.S. Appl. No. 14/049,851 dated Dec. 31, 2013 (11 pages).
Office action in U.S. Appl. No. 14/100,071 dated Mar. 26, 2015 (21 pages).
Office action in U.S. Appl. No. 14/321,977 dated Apr. 3, 2015 (12 pages).
Office action in U.S. Appl. No. 13/847,111 dated Nov. 5, 2013 (6 pages).
Office action in U.S. Appl. No. 14/644,508 dated Nov. 10, 2015 (16 pages).
Nu-Line® Introducting Nu-Line Aerodynamic Trailer Skirts brochure NLTS-0314 (2 pages) 2014.
Office action in U.S. Appl. No. 14/923,610 dated Dec. 13, 2016 (7 pages).

* cited by examiner

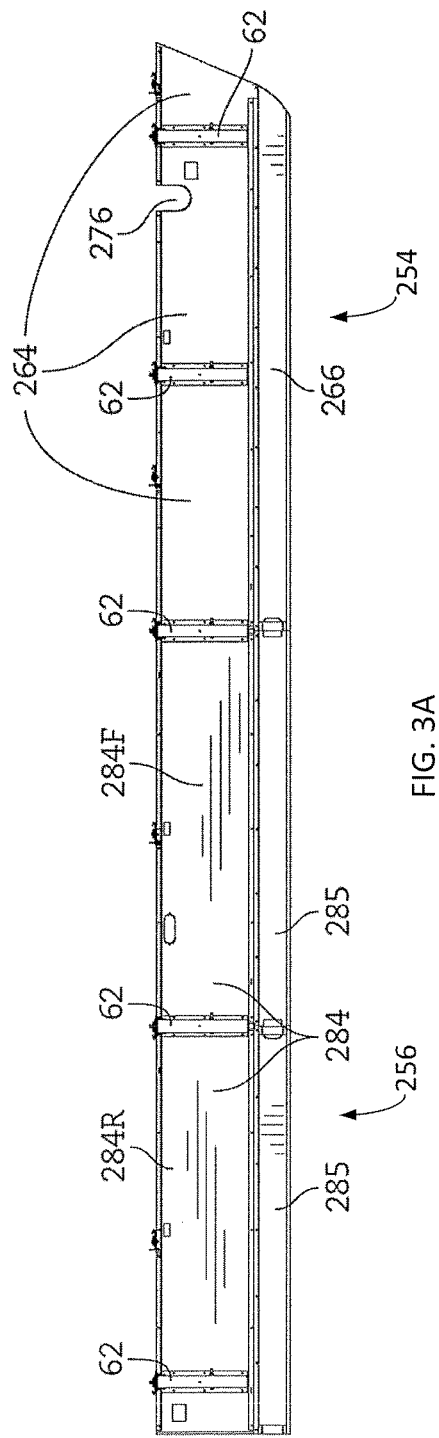
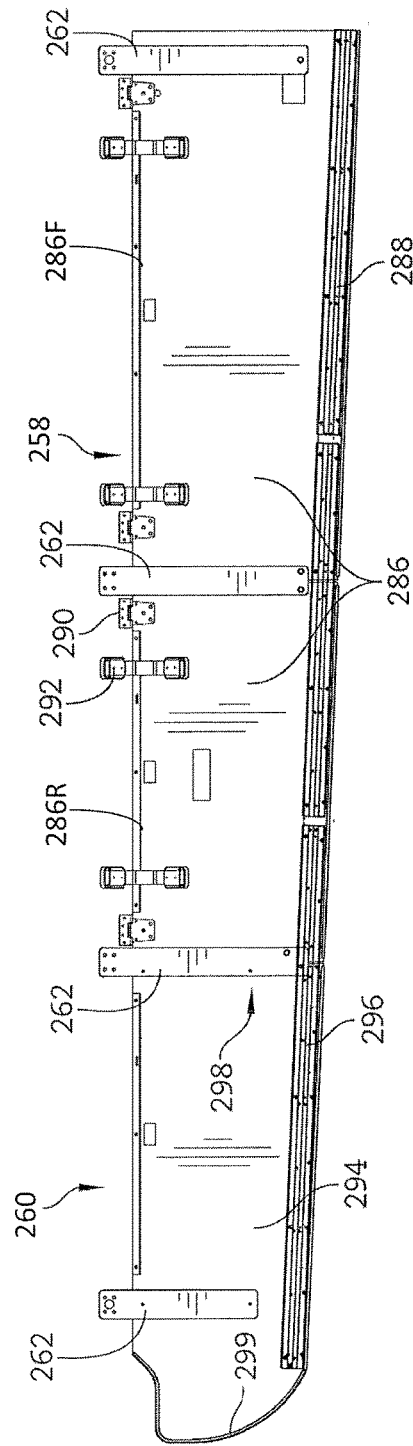
FIG. 3A
FIG. 3B

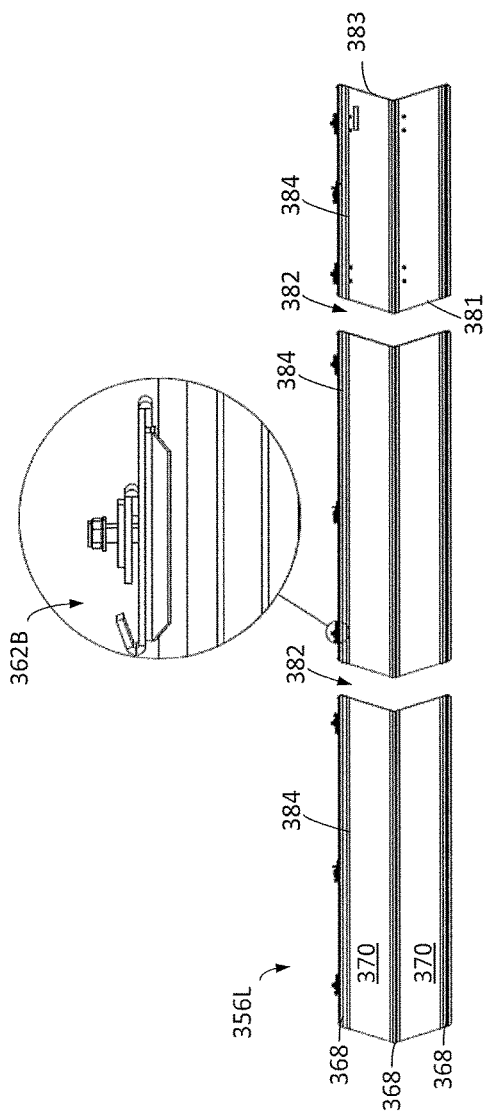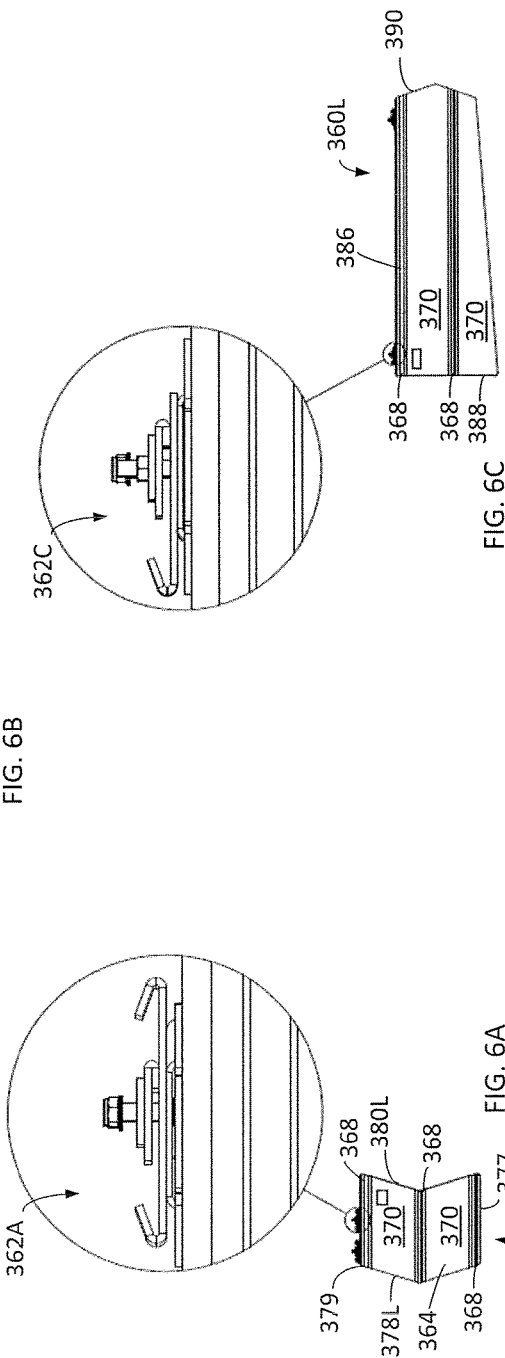

SKIRT SYSTEM MOUNT BRACKET ASSEMBLY

CROSS-REFERENCE TO RELATED APPLICATIONS

This application claims the benefit of U.S. Provisional Application Ser. No. 62/402,234, filed on Sep. 30, 2016, and entitled "Skirt System Mount Bracket Assembly," the disclosure of which is hereby incorporated by reference in its entirety.

BACKGROUND

To reduce wind flow resistance and drag on a semi-trailer truck, trailer, a pup trailer, tractor, semitrailer, or other vehicle, aerodynamic devices may be used to redirect and control the flow of air passing around the vehicle. During operation of a tractor-trailer truck, air around the tractor-trailer truck may flow between the tractor unit and the trailer, or underneath the trailer, and impart a drag force to the trailer. Aerodynamic devices are designed to control the air flowing into the gap formed between the tractor unit and the trailer and underneath the tractor and trailer. Such reduction on the drag of the vehicle may conserve fossil fuels, as well as other sources of vehicle drive power for hybrid vehicles, battery-operated vehicles, and alternative fuel-based vehicles, for example.

SUMMARY

The present disclosure may comprise one or more of the following features and combinations thereof.

According to one embodiment of the present disclosure, a mount bracket assembly for a skirt system of a trailer is provided. The mount bracket assembly includes a channel mount configured to be coupled to a portion of the skirt system and an attachment assembly configured to be coupled to a flange of a cross-member of the trailer. The attachment assembly includes a top wall coupled to the channel mount and a mounting bracket fixed to the top wall. The mounting bracket includes two hook-shaped portions separated by a planar portion, wherein the two hook-shaped portions are each sized to fit over the flange.

In some embodiments, the mounting bracket is fixed at an angle with respect to the top wall, the angle being selected from the group consisting of 0 degrees, +13.8 degrees, and −13.8 degrees.

In some embodiments, the mounting bracket is fixed by welding to the top wall.

In some embodiments, the mounting bracket includes a first aperture and a second aperture, the top wall includes a third aperture and a fourth aperture, a first fastener is inserted through the first and third apertures, and a second fastener is inserted through the second and fourth apertures.

In some embodiments, the fourth aperture is formed as an opening to allow the second fastener to be positioned at one of at least three locations within the opening to change an angle of the mount bracket assembly.

In some embodiments, the opening provides for the angle to be between about 3 and about 30 degrees.

In some embodiments, a toe clamp positioned above the mounting bracket and configured to clamp a second flange of the cross-member.

In some embodiments, the mounting bracket includes a first aperture and a second aperture, the top wall includes a third aperture and a fourth aperture, the toe clamp includes a fifth aperture and a sixth aperture, a first fastener is inserted through the first, third, and fifth apertures, and a second fastener is inserted through the second, fourth, and sixth apertures.

In some embodiments, the mount bracket assembly further including an upper plate positioned above the toe clamp and further including seventh and eighth apertures through which the first and second fasteners extend, respectively.

According to another embodiment, a mount bracket assembly for a skirt system of a trailer is provided. The mount bracket assembly includes a channel mount configured to be coupled to the skirt system and an attachment assembly configured to attach the channel mount to the trailer. The attachment assembly includes a top wall coupled to the channel mount and including a first set of apertures therethrough, a mounting bracket fixed to the top wall at an angle and including a second set of apertures therethrough, a toe clamp including a third set of apertures therethrough, and an upper plate including a fourth set of apertures therethrough. Bolts are configured to be received through the first, second, third, and fourth sets of apertures when the first, second, third, and fourth sets of apertures are aligned and nuts configured to be tightened over each of the bolts to couple together the top wall, the mounting bracket, the toe clamp, and the upper plate.

In some embodiments, the angle is selected from the group consisting of 0 degrees, +13.8 degrees, and −13.8 degrees.

In some embodiments, at least one of the apertures of the top wall is formed as an opening to allow the bolt positioned therein to be positioned at one of at least three locations within the opening to change an angle of the mount bracket assembly.

In some embodiments, the opening provides for the angle to be between about 3 and about 30 degrees.

In some embodiments, the opening provides for the angle to be between about 10 and about 20 degrees.

According to yet another embodiment, a method for assembling a mount bracket assembly for a skirt system of a trailer is provided. The method includes providing a channel mount, a top wall with a first set of apertures, and a mounting bracket with a second set of apertures. The method also includes coupling the top wall to the channel mount, aligning the first set of apertures with the second set of apertures, and welding together the top wall and the mounting bracket.

In some embodiments, the top wall and the mounting bracket are welded together at a fixed angle selected from the group consisting of 0 degrees, +13.8 degrees, and −13.8 degrees.

In some embodiments, the providing step further includes providing a toe clamp with a third set of apertures and the aligning step further includes aligning the first, second, and third sets of apertures.

In some embodiments, the providing step further includes providing an upper plate with a fourth set of apertures, the aligning step further includes aligning the first, second, third, and fourth sets of apertures, and the method further includes the step of positioning the toe clamp above the mounting bracket and positioning the upper plate above the toe clamp.

In some embodiments, the method further includes the step of attaching the mount bracket assembly to a flange of a cross-member of the trailer by hooking a first of two hook portions of the channel mount around a first flange member of the flange and clamping a second flange member of the flange between the channel mount and the toe clamp.

In some embodiments, one of the apertures of the first set of apertures forms a channel to provide a varied alignment of the first and second sets of apertures to vary an angle between the top wall and the channel mount.

These and other features of the present disclosure will become more apparent from the following description of the illustrative embodiments.

BRIEF DESCRIPTION OF THE DRAWINGS

FIG. 3A is a side elevation view of an interior of a landing gear skirt and a side skirt of the skirt assembly of FIG. 2;

FIG. 3B is a side elevation view of an interior of a rear wheel assembly skirt and a rear skirt of the skirt assembly of FIG. 2;

FIG. 6A is a side elevation view of a landing gear skirt of the skirt assembly of FIG. 4 and a rigid dual-hook mount bracket assembly for attaching the landing gear skirt to the trailer;

FIG. 6B is a side elevation view of a side skirt of the skirt assembly of FIG. 4 and a spring-based mount bracket assembly for attaching the side skirt to the trailer;

FIG. 6C is a side elevation view of a rear skirt of the skirt assembly of FIG. 4 and a rigid mount bracket assembly for attaching the rear skirt to the trailer;

DETAILED DESCRIPTION

Figure 1:
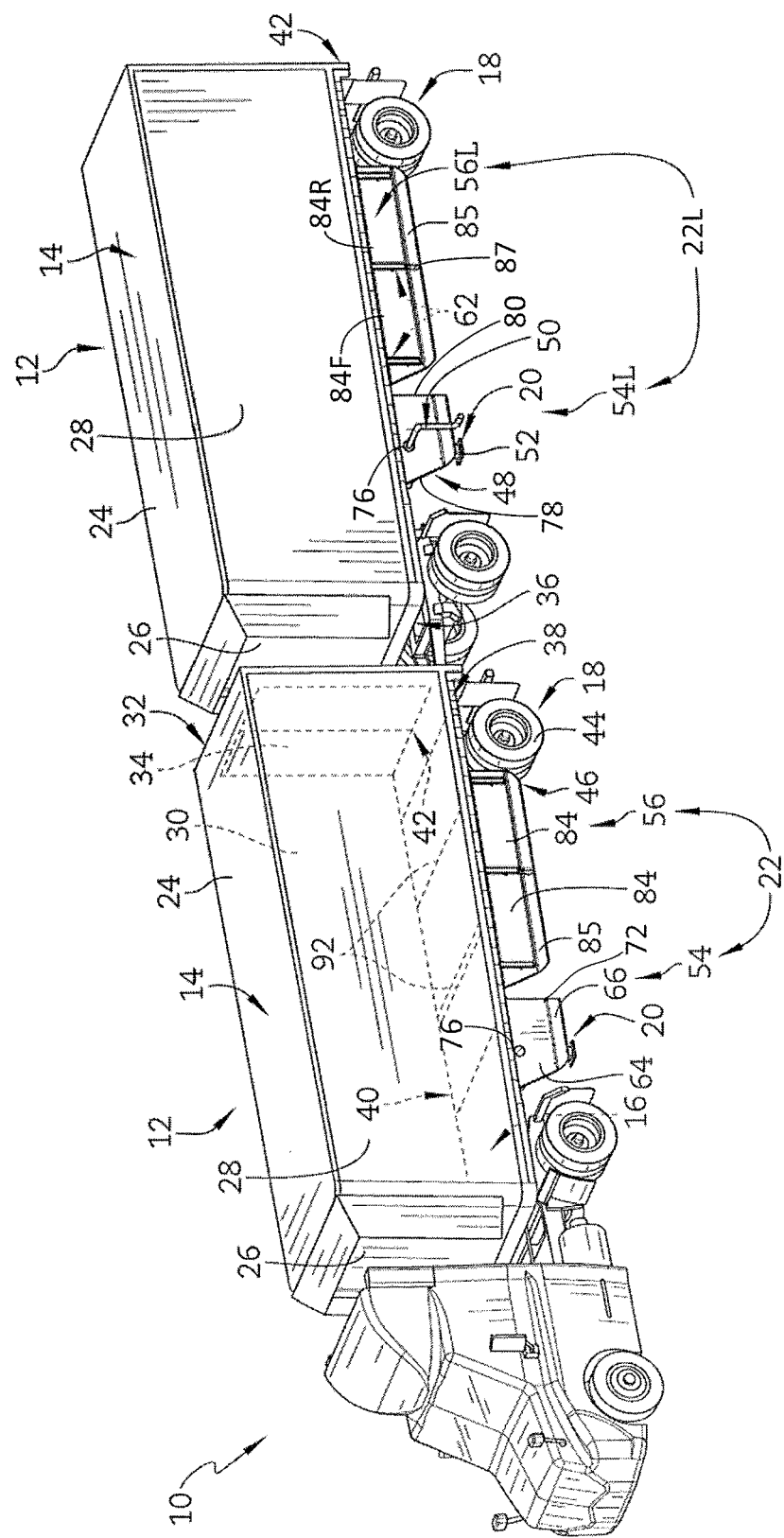
FIG. 1 is a top perspective view of a tractor and two pup trailers with skirt assemblies that may be secured to the trailers using any of the mount bracket assemblies described herein.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

For the purposes of promoting an understanding of the principles of the invention, reference will now be made to a number of illustrative embodiments shown in the attached drawings and specific language will be used to describe the same. While the concepts of this disclosure are described in relation to a trailer for a tractor, it will be understood that that they are equally applicable to other trailers generally, and more specifically to pup trailers, conventional flat-bed and/or box or van type trailers, examples of which include, but should not be limited to, straight truck bodies, small personal and/or commercial trailers and the like.

A tractor 10 can be coupled to one or more trailers 12 for transporting goods along a roadway, as shown in FIG. 1. Each trailer 12 may generally include a container 14, a floor 16, a rear wheel assembly 18, a landing gear 20, and a skirt system 22. The skirt system 22 is coupled to the floor 16 and is configured to redirect air and improve fuel efficiency of the tractor 10 when transporting goods.

As shown in FIG. 1, the container 14 of the trailer 12 can have a roof 24, a front wall 26, a left wall 28, a right wall 30, and a rear frame assembly 32. The rear frame assembly 32 can include a rear frame and one or more doors 34, for example, swing doors or an overhead door, to allow access to the interior of the container 14.

The floor 16 of the trailer 12 has a front side 36, a left side 38, a right side 40, a back side 42, and a plurality of cross-members 92 extending from the left side 38 to the right side 40, as shown in FIG. 1. The floor 16 is included in an embodiment of trailer 12 in which the floor 16 supports the container 14. Alternatively, the trailer 12 may be a flat-bed trailer that does not include the container 14.

The rear wheel assembly 18 is coupled to the floor 16 near the back side 42 of the floor 16, as shown in FIG. 1. The rear wheel assembly 18 includes wheels 44 and an axle 46 that support the rear of the trailer 12 when the trailer 12 is being pulled by the tractor 10, and when the trailer 12 is stationary and disconnected from the tractor 10.

The landing gear 20 is coupled to the floor 16 between the rear wheel assembly 18 and the front side 36 of the floor 16, as shown in FIG. 1. The landing gear 20 includes at least one support leg 48, a crank handle 50, and may contain a landing gear foot 52. The support leg 48 can extend down from the floor 16 to a surface to support the trailer 12 when not connected to the tractor 10, or can be retracted when connected to the tractor 10. The support leg 48 of the landing gear 20 can be extended or retracted using the crank handle 50.

While the principles of the present invention are depicted as being utilized with respect to particular vehicles (i.e., trailers) and with particular skirt systems, one skilled in the art will recognize that the principles of the present invention may be utilized for attachment of any skirt system or aerodynamic device to any type of vehicle.

Figure 2:
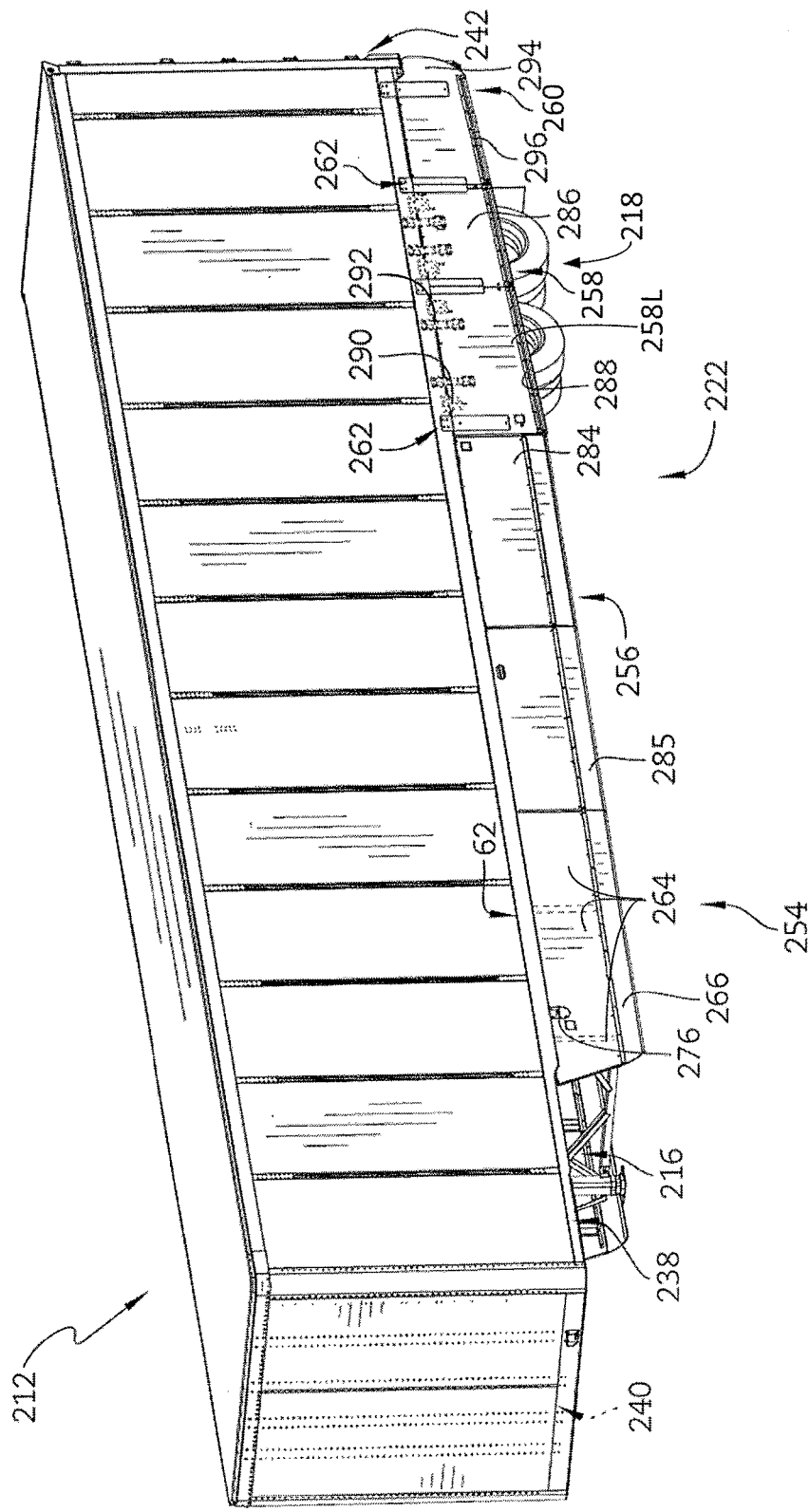
FIG. 2 is a top perspective view of a trailer with another skirt assembly that may be secured to the trailer using any of the mount bracket assemblies described herein.
Figure 4:
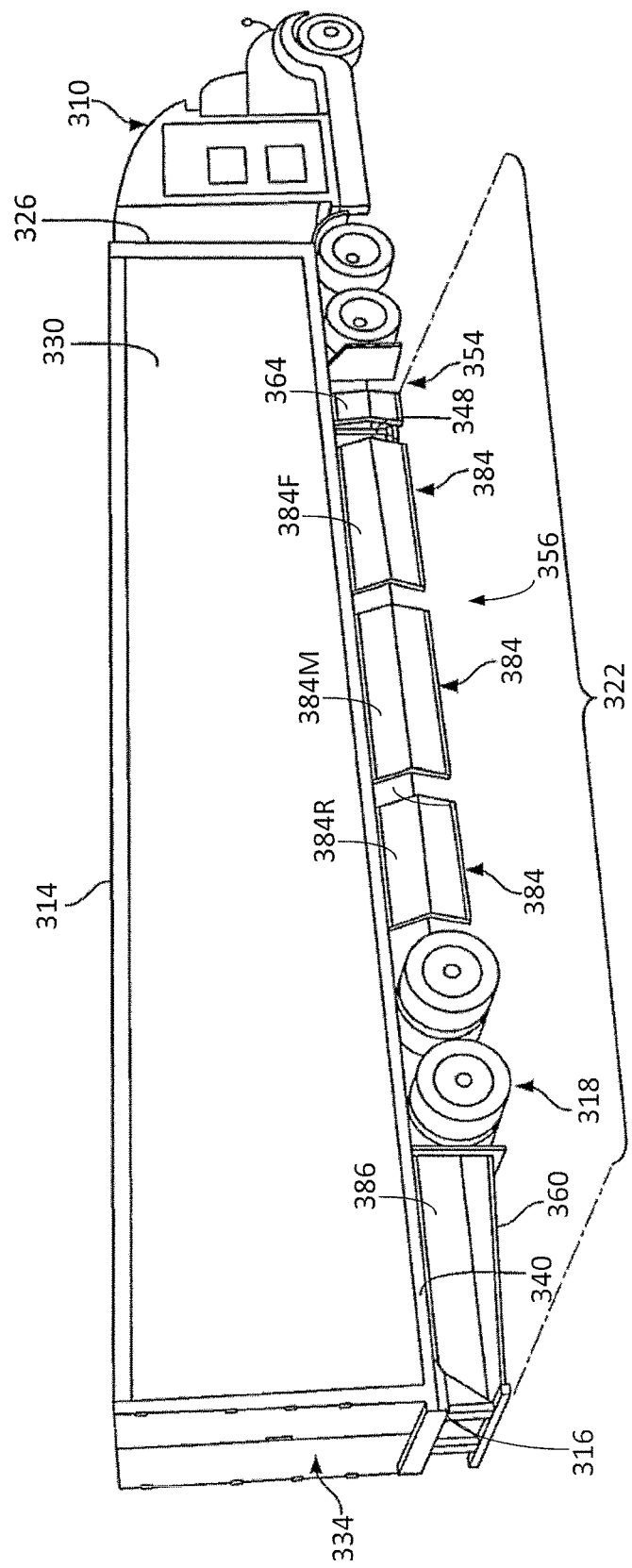
FIG. 4 is a perspective view of a tractor and a trailer with a further skirt assembly that may be secured to the trailer using any of the mount bracket assemblies described herein.

To improve the air flow and fuel efficiency of the tractor 10 when pulling a trailer 12, the trailer 12 can include an aerodynamic skirt system 22, as shown in FIG. 1. Skirt systems can include any combination of a landing gear skirt, a side skirt, a rear wheel assembly skirt, and a rear skirt. In an illustrative embodiment, as shown in FIG. 1, a skirt system 22 includes a landing gear skirt 54 and side skirt 56. In another illustrative embodiment, as shown in FIG. 2, a skirt system 222 of a trailer 212 includes a landing gear skirt 254, a side skirt 256, a rear wheel assembly skirt 258, and a rear skirt 260. In yet another illustrative embodiment, as shown in FIG. 4, a skirt system 322 of a trailer 312 includes a landing gear skirt 354, a side skirt 356, and a rear skirt 360. The trailers 212 and 312 generally include similar parts corresponding to those discussed above with respect to the trailer 12.

Generally, the skirt system 22 can be coupled to the trailer 12 along the left side 38 or the right side 40 of the floor 16, or both the left side 38 and the right side 40, as shown in FIG. 1. The skirt system 22 is attached to the left side 38 and/or the right side 40 of the floor 16 with mount bracket assemblies 62. Attaching the skirt system 22 with the mount bracket assemblies 62 can allow the skirt system 22 to tilt if contacted by an object to reduce stress on the skirt system 22 or the object. More specifically, the mount bracket assemblies 62 can allow the skirt system 22 to tilt laterally both inwardly and outwardly relative to the floor 16 (and, more specifically, to the cross-members 92). The ability of the skirt system 22 to tilt bi-laterally relative to a cross-member 92 (i.e., to tilt both inwardly and outwardly relative to the cross-member 92) allows the skirt system 22 to potentially avoid damage when the trailer 12 traverses into or over a fixed, immovable obstacle, for example, and thus runs laterally into the obstacle. It should also be understood, however, that the skirt system 22 may be sufficiently rigidly mounted to the floor such that the skirt system 22 is generally prevented from tilting under normal wind and road air forces.

The landing gear skirt 54 of the skirt system 22 may improve fuel economy by deflecting air away from the front side 36 of the trailer 12 and allowing air flow to attach to the side skirt 56 quicker. More specifically, the landing gear skirt 54 can help guide air from beneath the tractor 10 (and off of tires of the tractor 10) onto the side skirt 56. As shown in FIG. 1, the landing gear skirt 54 is coupled to the floor 16 of the trailer 12 and includes a wall panel 64 and a flexible bottom flap 66. The flexible bottom flap 66 is configured to attach to the wall panel 64 and provides a protective edge, as discussed below.

The wall panel 64 of the landing gear skirt 54 can be made from a composite material, or from a metal. For example, the composite material may include a plastic core and metal outer skins coupled to the plastic core. Such a composite material provides a rigid but lightweight and durable material. For example, each wall panel 64 may be made of a DURAPLATE® composite panel provided by Wabash National Corporation of Lafayette, Ind. DURAPLATE® composite panels are constructed of a high-density polyethylene plastic core bonded between two high-strength steel skins. For another example, the wall panel 64 can be made of a glass reinforced thermoplastic composite. It should be understood that other suitable composite materials may be used as well. Further, the wall panel 64 may be of any number of suitable, non-composite materials such as metals, metal alloys, and/or plastics, for example.

The flexible bottom flap 66 extends downwardly from the wall panel 64 to provide a less stiff strip along a bottom side 72 of the wall panel 64, as shown in FIG. 1. In some embodiments, the flexible bottom flap 66 is configured to be coupled to the bottom side 72 of the wall panel 64 along the entire length of wall panel 64. Illustratively, the flexible bottom flap 66 is made of plastic or rubber. However, other suitable materials may be used as well. The flexible bottom flap 66 further operates to resist airflow and may prevent damage to the wall panel 64 from forces applied vertically, such as in situations where the trailer 12 may traverse over a curb or railroad track where the road surface is not flat. In such instances, for example, the flexible bottom flap 66 is configured to bend or flex to prevent damage to the wall panel 64. In some embodiments, however, the wall panel 64 may not include a flexible bottom flap 66.

Additionally, the wall panel 64 can be formed to include an aperture 76 sized to allow passage of the landing gear crank handle 50, as shown in FIG. 1. The aperture 76 may be arranged along a top side of the wall panel 64 adjacent to the floor 16 of the trailer 12. The aperture 76 may be included in the right landing gear skirt 54R (not shown) or the left landing gear skirt 54L, or may be included in both the left landing gear skirt 54L and the right landing gear skirt 54R. In some embodiments, the aperture 76 may not be included either in the left landing gear skirt 54L or the right landing gear skirt 54R.

The landing gear skirt 54 can be coupled to the floor 16 of the trailer 12 as to be parallel with either the left side 38 or the right side 40 of the floor 16. Alternatively, the landing gear skirt 54 can be non-parallel with the either the left side 38 or the right side 40 of floor 16, as shown in FIG. 1. Illustratively, the left landing gear skirt 54L has a front edge 78 facing the front side 36 of the floor 16 and a back edge 80 facing the back side 42 of the floor 16. The left landing gear skirt 54L can be angled relative to the floor 16 so that front edge 78 is closer to the right side 40 of the floor 16 than the back edge 80. Orienting the landing gear skirt 54 in such a manner may lead to improved uptake of the air flow from underneath the trailer 12.

The skirt system 22 also includes a left side skirt 56L, as shown in FIG. 1, and a right side skirt 56R (not shown). The left side skirt 56L extends downwardly from and is located along the left side 38 of the floor 16 between the left landing gear skirt 54L and the rear wheel assembly 18. Similarly, the right side skirt 56R extends downwardly from and is located along the right side 40 of the floor 16 between the right landing gear skirt 54R and the rear wheel assembly 18. It should be understood that the trailer 12 has both a right skirt system 22R and a left skirt system 22L that are identical in configuration and function, even if only a single side is being described.

As shown in FIG. 1, the side skirt 56 includes two wall panels 84 coupled to each other and a flexible bottom flap 85. The wall panels 84 are secured to each other and to the trailer 12 by mount bracket assemblies 62. Illustratively, a first mount bracket assembly 62 is positioned to couple the forward wall panel 84F to the floor 16. A second mount bracket assembly 62 is positioned between and coupled to the forward wall panel 84F and the rear wall panel 84R to couple the two wall panels 84F, 84R to each other and to the floor 16. A third mount bracket assembly 62 is coupled to the rear wall panel 84R to secure the wall panel 84R to the floor 16. Illustratively, while the side skirt 56 includes three mount bracket assemblies 62 and two wall panels 84F, 84R, it is within the scope of this disclosure to provide a side skirt 56 having any number of mount bracket assemblies 62 and any number of wall panels 84. Further, it is within the scope of this disclosure for the side skirt 22 to include a single, unitary wall panel 84. The flexible bottom flap 85 of the side skirt 56 is similar to the flexible bottom flap 66 of the landing gear skirt 54. Illustratively, the wall panels 84F and 84R can each have a flexible bottom flap 85 coupled by a bracket 87, or alternatively can share a single flexible bottom flap 85. Also, in some embodiments, the wall panels 84F, 84R may not include a flexible bottom flap 85.

In another embodiment, a skirt system 222 includes a continuously connected landing gear skirt 254, a side skirt 256, a rear wheel assembly skirt 258, and a rear skirt 260, as shown in FIG. 2. The skirt system 222 can be coupled to a floor 216 of a trailer 212 using mount bracket assemblies 62, 262.

Illustratively, the landing gear skirt 254 includes an aperture 276 that is sized for a crank handle (not shown), three wall panels 264, mount bracket assemblies 62 to couple the wall panels 264 to each other and to the floor 216, and a single flexible bottom flap 266, as shown in FIGS. 2-3A. The wall panels 264 and the flexible bottom flap 266 of the landing gear skirt 254 are similar to the above-described corresponding parts of the landing gear skirt 54. However, in some embodiments, the wall panels 264 may not include a flexible bottom flap 266. Furthermore, the landing gear skirt 254 can be coupled to the side skirt 256 by mount bracket assemblies 62 to form a continuously connected skirt system 222, as shown in FIGS. 2-3A.

The side skirt 256 includes wall panels 284, mount bracket assemblies 62 that connect the wall panels 284 to the floor 216, and flexible bottom flaps 285. Illustratively, the side skirt 256 can have two wall panels 284F, 284R coupled to each other, as shown in FIG. 3A. The wall panels 284F, 284R are secured to each other and to the trailer 212 by mount bracket assemblies 62 in a similar fashion to the above-described side skirt 56. More specifically, a first mount bracket assembly 62 is positioned to couple the forward wall panel 284F to the floor 216 and to the landing gear skirt 254. A second mount bracket assembly 62 is positioned between and coupled to the forward and the rear wall panels 284F, 284R to couple the two wall panels 284F, 284R to each other and to the floor 216. A third mount bracket assembly 62 is coupled to the rear wall panel 284R to secure the wall panel 284R to the floor 216. Illustratively, while the side skirt 256 includes three mount bracket assemblies 62 and two wall panels 284, it is within the scope of this disclosure to provide a side skirt 256 having any number of mount bracket assemblies 62 and any number of wall panels 284.

The rear wheel assembly skirt 258 includes wall panels 286, mount bracket assemblies 262 for coupling the wall panels 286 to the floor 216, and bottom strips 288, as shown in FIGS. 2 and 3B. The rear wheel assembly skirt 258 extends downwardly from the floor 216 and is positioned along the left side 238 or the right side 240 of the floor 216. Illustratively, the rear wheel assembly skirt 258 is located between the back side 242 of the floor 216 and the side skirt 256, and locates the rear wheel assembly 218 within a footprint of the left wheel assembly skirt 258L and the right wheel assembly skirt 258R (not shown) when the trailer 212 is viewed from the left side or the right side of the trailer 212. In some embodiments, the rear wheel assembly skirt 258 extends all the way to the back side 242 of the floor 216. Also, the rear wheel assembly skirt 258 can be coupled to the side skirt 256 or may not be coupled to side skirt 256.

As shown in FIG. 3B, the rear wheel assembly skirt 258 can have two wall panels 286F, 286R coupled to each other. The wall panels 286F, 286R are secured to each other and to the trailer 212 by mount bracket assemblies 262. Illustratively, a first mount bracket assembly 262 is positioned to couple the forward wall panel 286F to the floor 216 and is comprised of a stiff metal plate. A second mount bracket assembly 262 is positioned between and coupled to the forward and the rear wall panels 286F, 286R to couple the two wall panels 286F, 286R to each other and to the floor 216. A third mount bracket assembly 262 is coupled to the rear wall panel 286R to secure the rear wall panel 286R to the floor 216 and optionally to the rear skirt 260, as shown in FIG. 3B.

The rear wheel assembly skirt 258 further includes hinges 290 and tethers 292 that couple the wall panels 286 to the floor 216, as shown in FIGS. 2 and 3B. The hinges 290 allow pivoting of the wall panels 286 relative to the floor 216, while the tethers 292 provide an additional attachment point of the wall panels 286 to the floor 216. Also, the bottom strip 288 is similar in composition and function to the flexible bottom flaps 266, 285 of the landing gear skirt 254 and the side skirt 256, respectively. Illustratively, while the rear wheel assembly skirt 258 includes three mount bracket assemblies 262 and two wall panels 286F, 286R, it is within the scope of this disclosure to provide a rear wheel assembly skirt 258 having any number of mount bracket assemblies 262 and any number of wall panels 286.

The rear skirt 260 includes a wall panel 294, mount bracket assemblies 262 for coupling the wall panel 294 to the floor 216, and a bottom strip 296, as shown in FIGS. 2 and 3B. The rear skirt 260 extends downwardly from the floor 216, along the left side 238 or the right side 240 of the floor 216, and is located between the back side 242 of the floor 216 and the rear wheel assembly skirt 258. Illustratively, the rear skirt 260 can be coupled to the rear wheel assembly skirt 258 with a mount bracket assembly 262.

The wall panel 294 of the rear skirt 260 includes a forward edge 298 and a rear edge 299, as shown in FIG. 3B. Illustratively, the forward edge 298 extends down from the floor 216 and is generally perpendicular to floor 216, and the rear edge 299 can be straight or curved to provide additional aerodynamic properties to the trailer 212.

Figure 5:
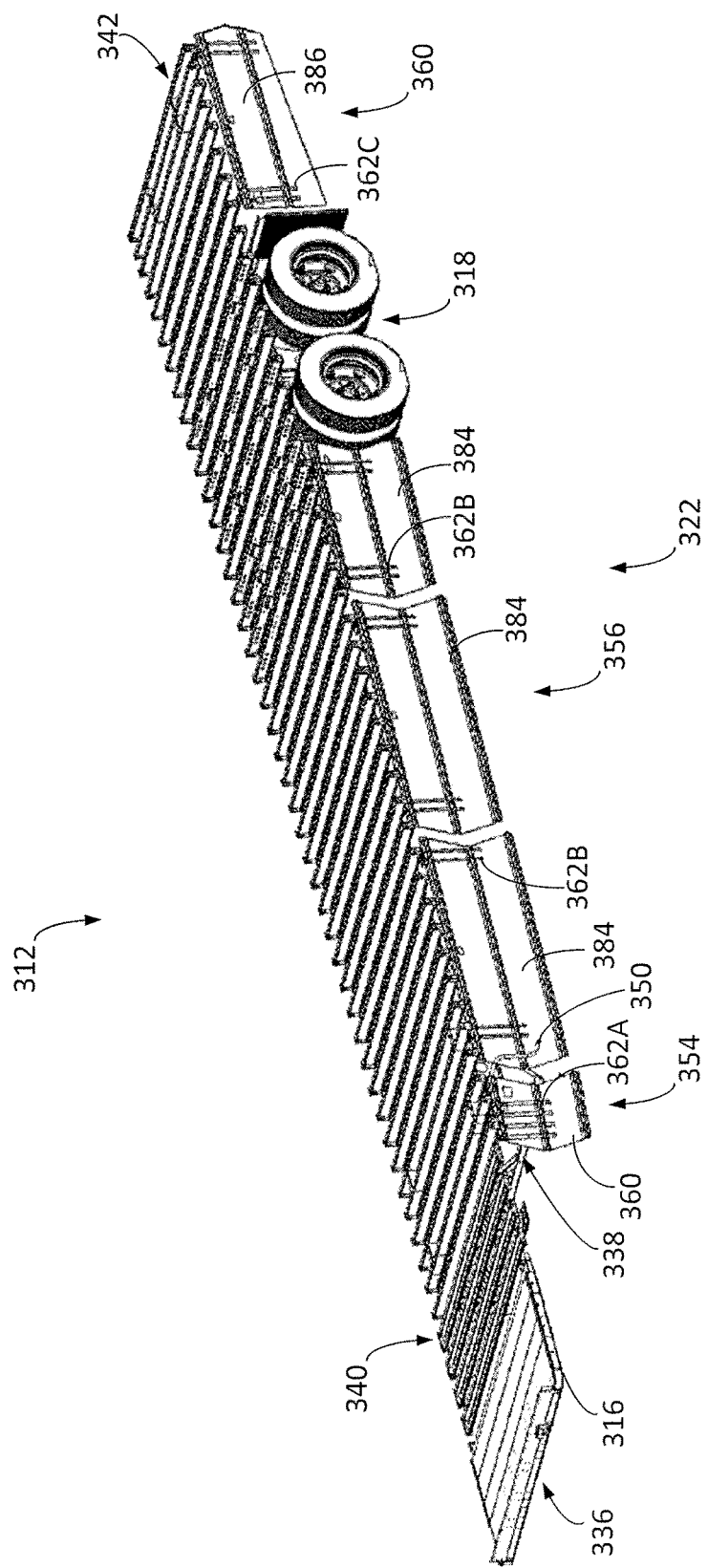
FIG. 5 is a top perspective view of the skirt assembly and a floor of the trailer of FIG. 4.

According to another embodiment, a skirt system 322 includes a landing gear skirt 354, a side skirt 356, and a rear skirt 360, as shown in FIGS. 4 and 5. The skirt system 322 can be coupled to a floor 316 of a trailer 312 using mount bracket assemblies 362 to improve the airflow around the trailer 312.

Illustratively, the landing gear skirt 354 is sized to permit clearance for a crank handle 350 between the landing gear skirt 354 and the side skirt 356, as shown in FIG. 5. The landing gear skirt 354 includes a wall panel 364 and mount bracket assemblies 362 to couple the wall panel 364 to the floor 316. The wall panel 364 includes top, middle, and bottom horizontal ribs 368 that project outwardly away from the trailer 312 and that are separated by generally planar portions 370, as shown in FIGS. 6A-6C. The ribs 368 are provided to increase the stiffness of the wall panel 364. While three sets of ribs 368 are provided, it should be understood that the wall panel 364 may be configured to include any number of suitable ribs, or no ribs at all, in order to modify the stiffness of the wall panel 364 to that of a specifically desired level. It should also be understood that the wall panel 364 may also, or alternatively, include ribs 368 which project inwardly. Further, while the illustrative ribs 368 are horizontal, it should be understood that the wall panels disclosed herein may include ribs which are vertical, curved, and/or diagonal, for example. Additionally, in some embodiments, the wall panel 364 can further include a flexible flap (not shown) similar to the flap 66 of the landing gear skirt 56.

Figure 7:
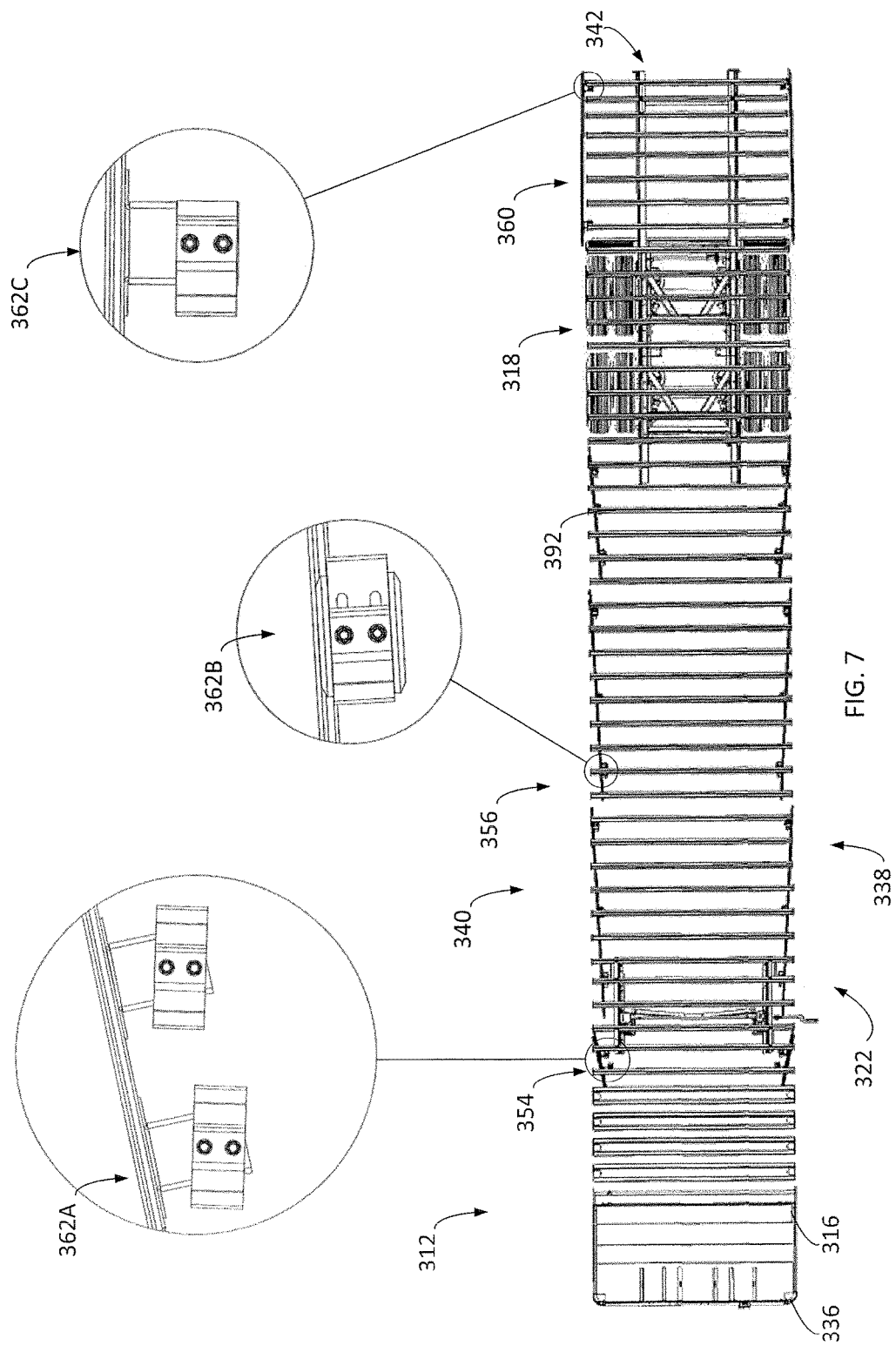
FIG. 7 is a top plan view of the skirt assembly and the floor of the trailer of FIG. 4, including the mount bracket assemblies of FIGS. 6A-6C.

The landing gear skirt 354 can be coupled to the floor 316 as to be parallel with either the left side 338 or the right side 340 of the floor 316 of the trailer 312. Alternatively, the landing gear skirt 354 can be non-parallel with the either the right side 340 or the left side 338 of floor 316. For example, the left landing gear skirt 354L has a front edge 378L facing the front side 336 of the floor 316, a back edge 380L facing the back side 342 of the floor 316, a top edge 377 facing toward the floor 316, and a bottom edge 379 facing away from the floor 316, as shown in FIG. 6A. The left landing gear skirt 354L is angled relative to the floor 316 so that front edge 378L is closer to the right side 340 of the floor 316 than the back edge 380L, as shown in FIG. 7. Orienting the landing gear skirt 354 in this non-parallel manner may lead to improved uptake of air flow from underneath the tractor 310 and/or the trailer 312.

Additionally, the top and bottom edges 377, 379 of the landing gear skirt 354 are generally parallel to each other and define generally straight, horizontal lines, while the front and rear edges 378, 380 are generally V-shaped. Illustratively, the point of the V-shaped edges 378, 380 is located at the center of the wall panel 364 and is aligned with the middle rib 368 of the wall panel 364, as shown in FIG. 6A. Further, the point of the V-shaped edges 378, 380 is positioned forward of the top and bottom ends of the respective front and rear edges 378, 380. While the particular edges 378, 380 of the wall panel 364 disclosed herein are V-shaped, it should be understood that it is within the scope of this disclosure to include front and rear edges 378, 380 as well as top and bottom edges 377, 379 which are straight, curved, angled, and/or combinations of each.

The side skirt 356 includes wall panels 384 and mount bracket assemblies 362 that couple the wall panels 384 to the floor 316, as shown in FIGS. 4-5. Illustratively, the side skirt 356 can have three wall panels 384F, 384M, 384R separated horizontally from each other, as shown in FIGS. 4, 5, and 6B. The wall panels 384F, 384M, 384R can be secured to the trailer 312 by the mount bracket assemblies 362 in a similar fashion to that described above with respect to the side skirt 56. More specifically, a first mount bracket assembly 362 and a second mount bracket assembly 362 are positioned at front and rear ends of the forward wall panel 384F to couple the forward wall panel 384F to the floor 316, as shown in FIG. 5. A third mount bracket assembly 362 and a fourth mount bracket assembly 362 are positioned at front and rear ends of the middle wall panel 384M to couple the middle wall panel 384M to the floor 316. A fifth mount bracket assembly 362 and a sixth mount bracket assembly 362 are positioned at front and rear ends of the rear wall panel 384R to couple the rear wall panel 384R to the floor 316. Illustratively, while the side skirt 356 includes six mount bracket assemblies 362 and three wall panels 384F, 384M, 384R, it is within the scope of this disclosure to provide a side skirt 356 having any number of mount bracket assemblies 362 and any number of wall panels 384.

The wall panels 384F, 384M, 384R can include ribs 368 that project outwardly away from the trailer 312 and can be similar in shape and composition as the wall panel 364 of the landing great skirt 354. For example, the wall panels 384 can include V-shaped front and rear edges 381, 383. As shown in FIGS. 4 and 6B, the wall panels 384F, 384M, 384R can be horizontally spaced apart from each other and from the wall panel 364 of the landing gear skirt 354. As a result, the V-shaped edges 378, 380, 381, 383 of adjacent panels 364, 384 cooperate to define generally V-shaped, horizontally-extending gaps, or spaces, 382 between adjacent wall panels 364, 384.

The wall panels 364, 384 can be sized and positioned relative to each other to create an air curtain over the gaps 382 so that air deflected from the first wall panel 364 is deflected over the gap 382 and to the second wall panel 384F, and so on. Illustratively, the gaps 382 between each wall panel 364, 384 operate to allow airflow from under the floor 316 (which may cause additional drag against the rear wheel assembly 318) to escape, or vent, out from under the trailer 312, particularly in situations where cross-winds across the trailer 312 are present. While the side skirt 356 includes wall panels 384F, 384M, 384R separated by gaps 382, it is within the scope of this disclosure to provide a side skirt 356 having adjacent wall panels 384 secured together by mount bracket assemblies 362 similar to the above-described wall panel 84 and the mount bracket assembly 62. Additionally, in some embodiments, the wall panel 384 can further include a flexible flap (not shown) similar to the flap 85 of side skirt 56.

The rear skirt 360 includes a wall panel 386 and mount bracket assemblies 362 for coupling the wall panel 386 to the floor 316, as shown in FIGS. 4-5. The rear skirt 360 extends downwardly from the floor 316 and along the left side 338 or the right side 340 of the floor 316 and is located between the back side 342 of the floor 316 and the rear wheel assembly 318. Illustratively, a first mount bracket assembly 362 and a second mount bracket assembly 362 are positioned at front and rear ends of the wall panel 386 to couple the wall panel 386 to the floor 316, as shown in FIGS. 5 and 6C.

The wall panel 386 can include ribs 368 that project outwardly away from the trailer 312 and can be similar in composition as the wall panel 364 of the landing gear skirt 354. Also, the wall panel 386 of the rear skirt 360 includes a forward edge 388 and a rear edge 390, as shown in FIG. 6C. Illustratively, the forward edge 388 extends down from the floor 316 and is generally perpendicular to the floor 316, and the rear edge 390 can be curved to provide additional aerodynamic properties to the trailer 312.

It is within the scope of this disclosure to provide a skirt assembly wherein any suitable number or type of the same or different mount bracket assemblies are used to couple the panels to the floor 316 of the trailer 312. As shown in FIGS. 5-7, the skirt system 322 can include one or more rigid dual-hook mount bracket assemblies 362A configured to couple the wall panel 364 to the floor 316, one or more spring-based mount bracket assemblies 362B configured to couple wall panels 384 to the floor 316, and/or one or more rigid mount bracket assemblies 362C configured to couple the wall panel 386 to the floor 316. Each mount bracket assembly 362 is coupled to a cross-member 392 of the floor 316. As further discussed below, the spring-based mount bracket assemblies 362B may permit the panels 384 to tilt laterally with respect to the cross-members 392, similar to mount bracket assembly 62 of FIG. 1, while the mount bracket assemblies 362A, 362C rigidly mount the panels 364, 386 to the floor 316 so that the panels 364, 386 are prevented from tilting under normal wind and road air forces. Despite the generally rigid coupling, however, the wall panels 364, 386 can be made of material that allows the panels 364, 386 to flex and bend when impacted by, or traveling over, an object in the path of the wall panels 364, 386. The wall panels 364, 386 can then resiliently return to their generally vertical orientation after passing over such an object.

Figure 8A:
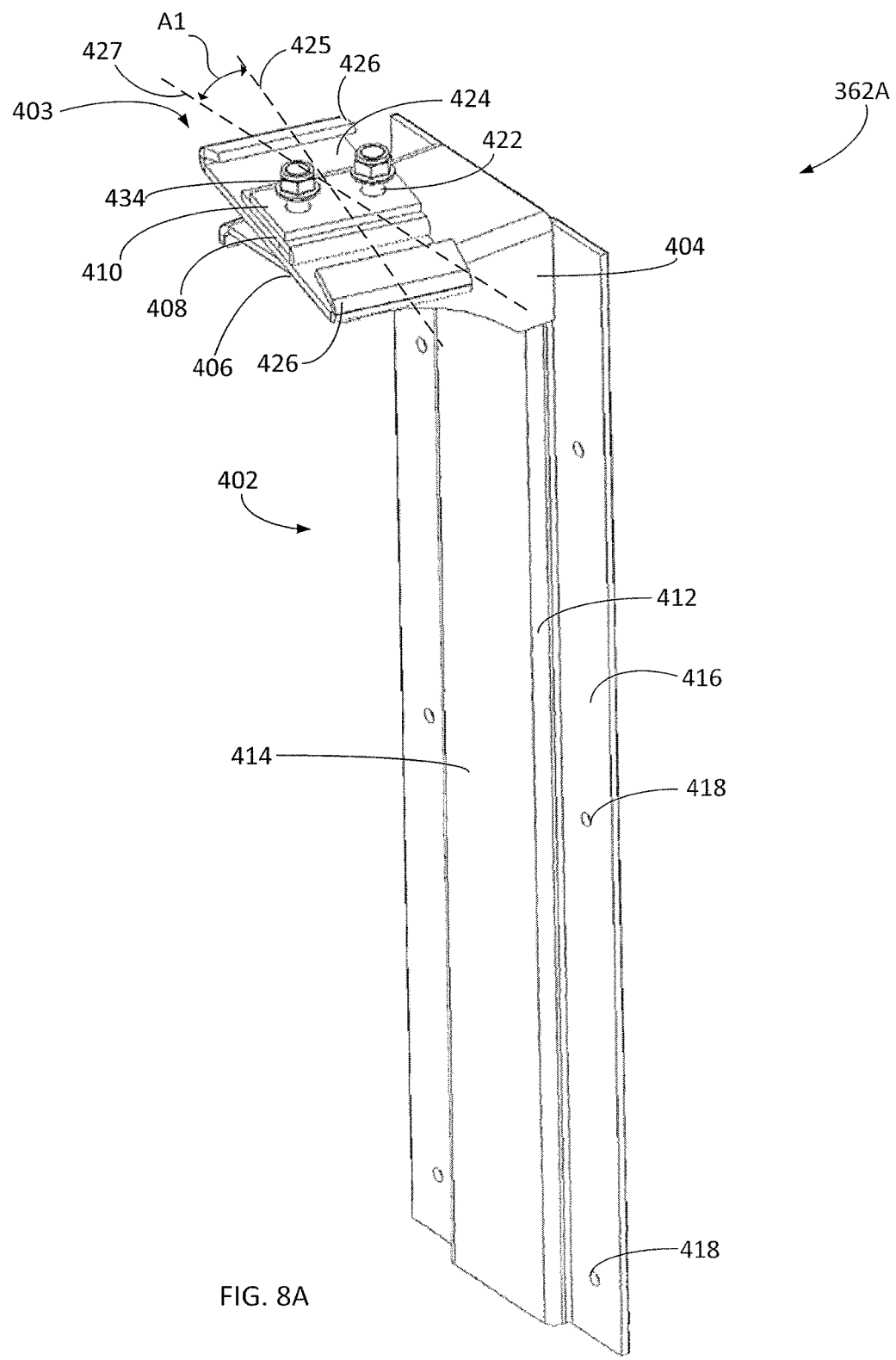
FIG. 8A is a top perspective view of the rigid dual-hook mount bracket assembly of FIG. 6A.
Figure 8B:
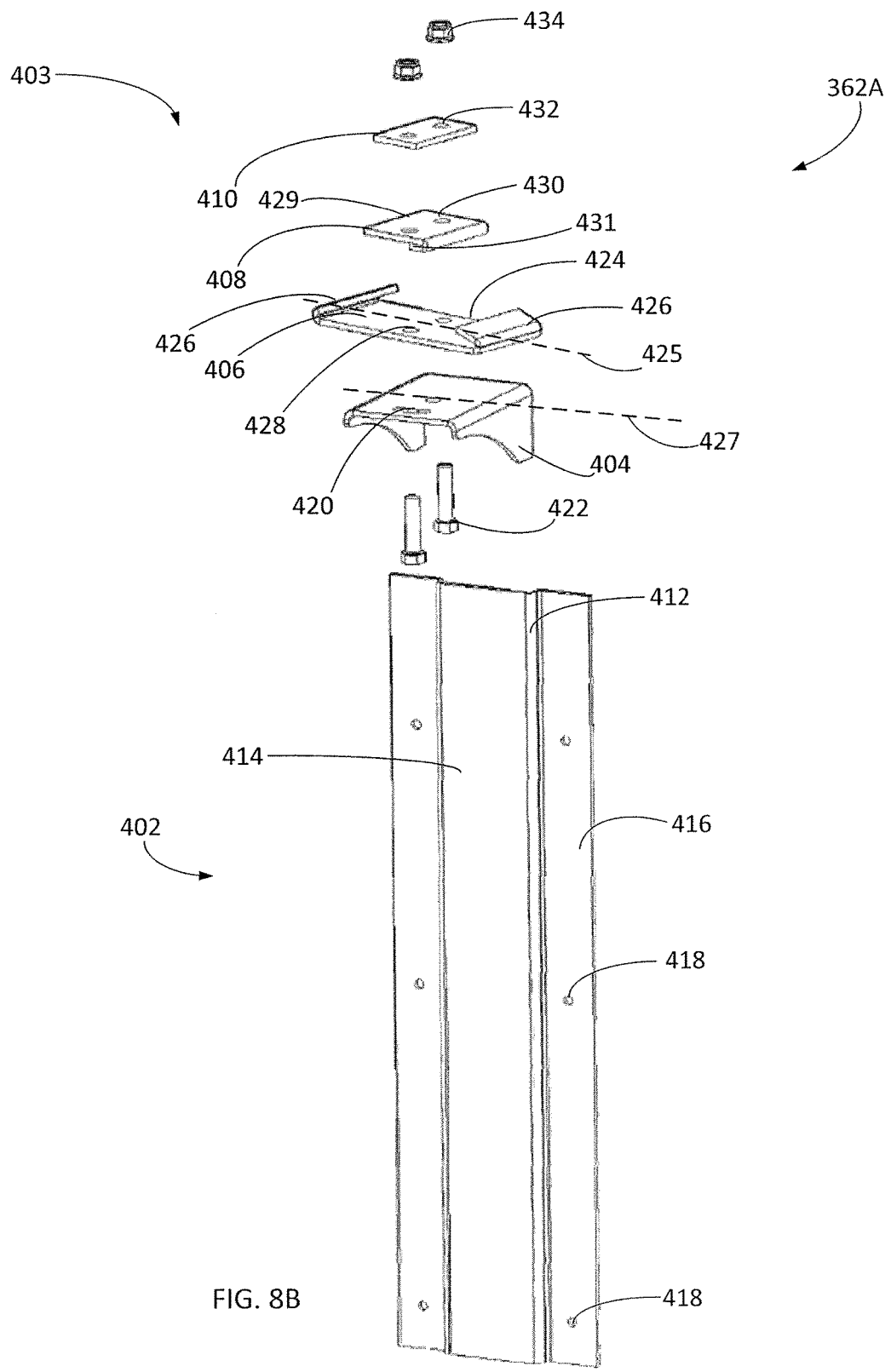
FIG. 8B is an exploded top perspective view of the rigid dual-hook mount bracket assembly of FIG. 6A.

As described above, the wall panel 364 of the landing gear skirt 354 can be coupled to the floor 316 using the rigid dual-hook mount bracket assembly 362A shown in FIGS. 5-7. As shown in FIGS. 8A-8B, each rigid dual-hook mount bracket assembly 362A generally includes a channel mount 402 and an attachment assembly 403. The attachment assembly 403 generally includes a top wall 404, a mounting bracket 406, a toe clamp 408, an upper plate 410, bolts 422, and nuts 434. The channel mount 402 is configured to be coupled to the wall panel 364, and the attachment assembly 403 is configured to couple the mount bracket assembly 362A to the cross-member 392.

The channel mount 402 includes spaced-apart side walls 412, an inside wall 414, and side flanges 416 extending outwardly from outer edges of each of the side walls 412. Illustratively, the sidewalls 412 and the inside wall 414 cooperate to define a passageway (not shown) therebetween. Each side flange 416 includes a plurality of apertures 418 formed therein, with each aperture 418 being configured to receive a fastener, such as a bolt, rivet, screw or any other suitable fastener (not shown), in order to couple the channel mount 402 to a wall panel 364.

Figure 8C:
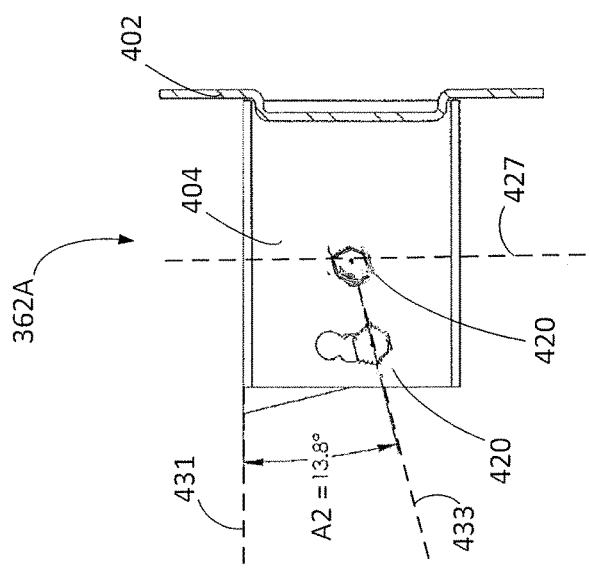
FIG. 8C is a top plan view of a top wall of the rigid dual-hook mount bracket assembly of FIG. 6A.

The top wall 404 can be coupled to the channel mount 402 (for example, via welding) or, alternatively, can be otherwise attached or integral with the channel mount 402. The top wall 404 includes two apertures 420 (although any suitable number may be utilized) each configured to receive one of the threaded bolts 422 therethrough. As shown in FIG. 8C, one of the apertures 420 in the top wall 404 forms one or more openings (that may be interconnected) that define three (or another suitable number) locations for one of the bolts 422 to be positioned therethrough. The three locations permit the rigid dual-hook mount bracket assembly 362A to be coupled to a cross-member 392 at three different angles relative to the cross-member 392, as further discussed below. In other embodiments, the aperture 420 may be a continuous opening having any number of different locations that provide any number of different potential angles.

Figure 9:
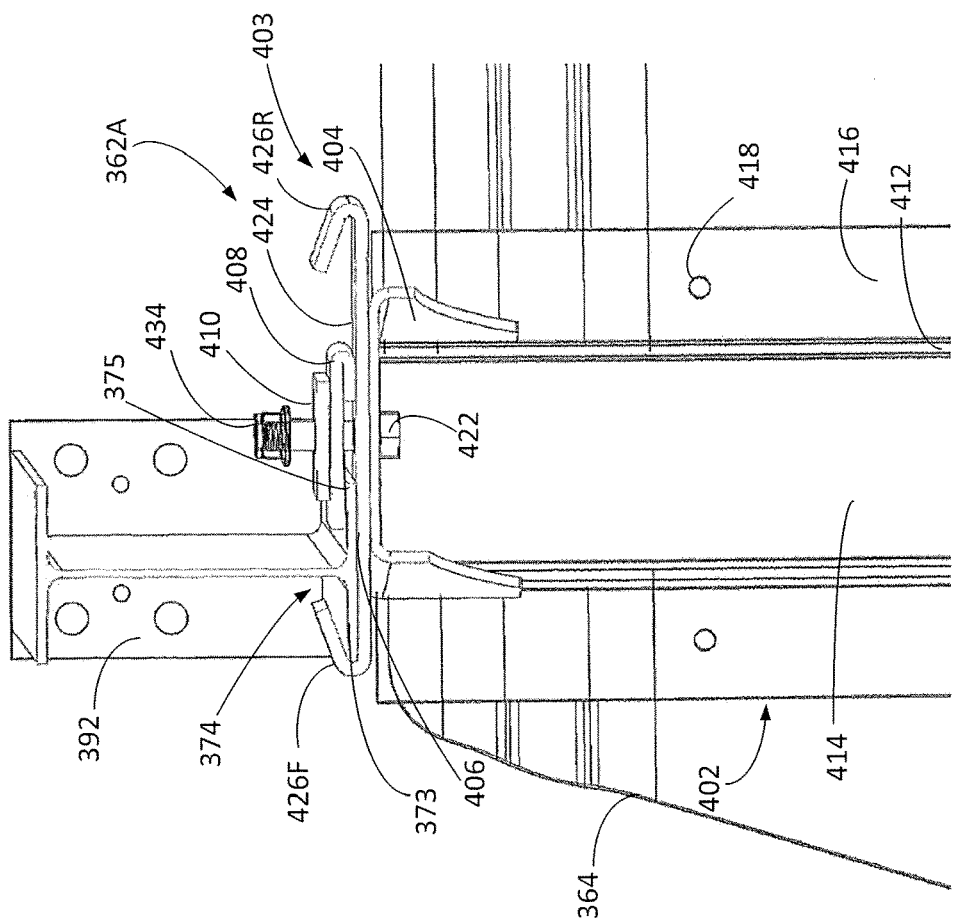
FIG. 9 is a partial cutaway view of the rigid dual-hook mount bracket assembly of FIG. 6A coupled to a trailer floor.

As shown in FIG. 8B, the mounting bracket 406 includes a planar portion 424 and upwardly turned hook-shaped portions 426 at each end of the planar portion 424. Apertures 428 are formed through the planar portion 424 to receive the two bolts 422 therethrough. Illustratively, the hook-shaped portions 426 are configured to engage an outer edge 373 of a bottom flange 374 of a cross-member 392 so that an upper surface of the planar portion 424 is engaged with a lower surface of the bottom flange 374, as shown in FIG. 9.

In some embodiments, the mounting bracket 406 can be welded to the top wall 404. More specifically, the mounting bracket 406 can be welded to the top wall 404 at a fixed angle relative to the top wall 404. The two apertures 428 of the mounting bracket 406 are aligned with the apertures 420 of the top wall 404 to fix the weldment into place at a set, pre-defined angle. In other embodiments, the mounting bracket 406 may be otherwise immovably fixed to the top wall 404 in any suitable manner.

As discussed above, one of the apertures 420 in the top wall 404 forms three defined locations for a bolt 422 to be positioned therethrough. As a result, the mounting bracket 406 can be fixed and welded at one of these set angles, such as at 0 degrees, +13.8 degrees, or −13.8 degrees relative to the top wall 404, as shown in FIG. 8C. More particularly, a longitudinal axis 425 is positioned at an angle A1 with respect to an axis 427 that is generally perpendicular to a longitudinal extent (or a side edge) of the top wall 404. Put another way, a line or axis 433 extending through centerpoints of the bolts is positioned at an angle A2 with respect to a line or axis 431 extending along an edge (or through a center) of the top wall 404. A1 and A2 are the same and may be between about 0 degrees and about 45 degrees, or between about 5 degrees and about 30 degrees, or between about 10 degrees and about 20 degrees. Also, while three positions of the bolt 422 within one of the apertures, any number of positions may be utilized.

As discussed above, the wall panel 364 can be coupled to the floor 316 in a non-parallel manner relative to the left side 338 and the right side 340 of the floor 316 to enhance aerodynamic effect of the landing gear skirt 354. The angled weldment of the mount bracket assembly 362A enables this non-parallel coupling while still permitting the channel mount 402 to be mounted parallel to the wall panel 364 and the planar portion 424 of the mounting bracket 406 to be mounted parallel to the bottom flange 374 of the cross-member 392. These perpendicular couplings may be stronger than angled couplings and make installation easier and more uniform compared to angled couplings. For example, the perpendicular coupling permits more surface area of the hook-shaped portion 426 to grip the bottom flange 374 during coupling, which may decrease the chance of the mount bracket assembly 362A falling off of the cross-member 392 during and after installation. Illustratively, while a 13.8-degree fixed angle between the mounting bracket 406 and the top wall 404 is shown and described herein, it is also within the scope of this disclosure to use other angles so that the wall panel 364 provides maximum aerodynamic effect for the trailer 312.

Illustratively, as noted above and shown in FIGS. 8A and 8B, the toe clamp 408 includes a planar portion 429 with two apertures 430 configured to receive the bolts 422 therethrough and a spacer 431 coupled to or integral with the planar portion 429. The upper plate 410 includes two apertures 432 also configured to receive the bolts 422 therethrough. A pair of nuts 434 is provided to secure the bolts 422 to the top wall 404, the mounting bracket 406, the toe clamp 408, and the upper plate 410. In this manner, the mounting bracket 406, the toe clamp 408, and the upper plate 410 are secured to the top wall 404 at the desired angle.

As shown in FIG. 9, the rigid dual-hook mount bracket assembly 362A can be coupled to the lower flange 374 of a cross-member 392 of the floor 316 of the trailer 312. To attach the dual-hook mount bracket assembly 362A to the cross-member 392, one of the hook-shaped portions 426 of the mounting bracket 406 is hooked onto one outer edge 373 of the lower flange 374. The toe clamp 408 and the upper plate 410 are positioned above an opposite side edge 375 of the flange 374 so that apertures 420, 428, 430, 432 are aligned (i.e., so that the planar portion 429 of the toe clamp 408 contacts the opposite side edge 375 and the spacer 431 of the toe clamp 408 is adjacent to or touching the planar portion 424 of the mounting bracket 406). Once the components are aligned, the bolts 422 are slid through the apertures 420, 428, 430, 432 and the nuts 434 are tightened over the bolts 422 in order to secure the mount bracket assembly 362A to the cross-member 392 with one of the hook-shaped portions 426 hooked onto the outer edge 373 of one of the lower flanges 374 and the outer edge 373 of the other of the lower flanges 374 clamped between the top wall 404 and the upper plate 410.

Figure 10:
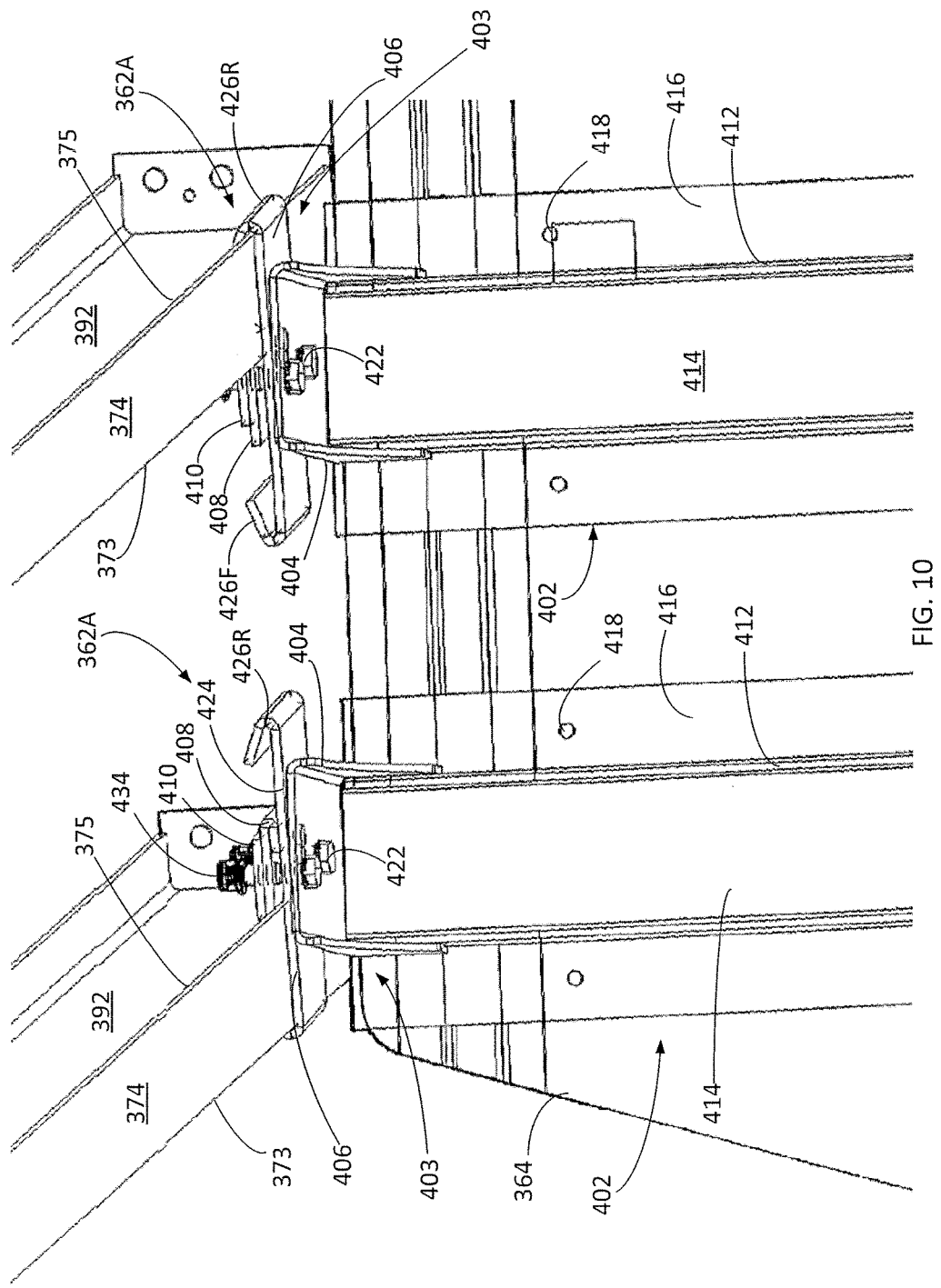
FIG. 10 is an underside view of two rigid dual-hook mount bracket assemblies of FIG. 6A coupled to a trailer floor.

As discussed above, the mounting bracket 406 includes both a front hook-shaped portion 426F and a rear hook-shaped portion 426R, as shown in FIG. 9. Either the front hook-shaped portion 426F or the rear hook-shaped portion 426R may be used to couple the mount bracket assembly 362A to a cross-member 392. As shown in FIG. 10, the mount bracket assembly 362A can be coupled to either side edge 373, 375 of the cross-member 392 without misaligning the wall panel 364 or having to readjust the mounting bracket 406 relative to the upper plate 410 and the channel mount 402. Rather, the welded mounting bracket 406 and upper plate 410 maintain the fixed angle regardless of the mounting position of the mount bracket assembly 362A (that is, forward or rear mounting to the cross-member 392). As discussed above, the set, fixed angle can more accurately provide maximum aerodynamic effect for the trailer 312. Further, the dual hook-shaped portions 426F, 426R and the fixed angle permit easier repositioning of the wall panel 364 to the floor 316 without having to reposition the mount bracket assembly 362A on the wall panel 364 or readjust mounting angles and alignment.

The rigid dual-hook mount bracket assembly 362A does not allow the channel mount 402, or the respective wall panel 364 mounted thereto, to tilt laterally inwardly or outwardly. Rather, the rigid dual-hook mounting bracket assemblies 362A, and connected wall panel 364, are rigidly mounted to the floor assembly 316. As noted above, however, while the wall panel 364 is generally rigidly mounted to the floor assembly 316, the panel 364 can be made of material that can flex and bend when impacted by, or traveling over, an object in the path of the wall panel 364.

Illustratively, the wall panels 384 of the side skirt 356 can be coupled to the floor 316 using the spring-based mount bracket assembly 362B, as shown in FIGS. 5-7. Similarly, the wall panel 386 of the rear skirt 360 can be coupled to the floor 316 using the rigid mount bracket assembly 362C, as shown in FIGS. 5-7. The spring-based mount bracket assembly 362B and the rigid mount bracket assembly 362C of FIGS. 5-7 are described in greater detail in U.S. application Ser. No. 14/644,508, entitled "Side Skirt System for a Trailer" (and published as U.S. Patent Application Publication No. 2015/0259014. The disclosure of such application/publication is hereby incorporated by reference in its entirety.

Furthermore, in some embodiments, the spring-based mount bracket assembly 362B and/or the rigid mount bracket assembly 362C can incorporate the dual-hook attachment assembly 403. More specifically, the dual-hook attachment assembly 403 can be welded to a channel mount of either mount bracket assembly 362B, 362C at an angle between about 0 degrees and about 45 degrees, or between about 5 degrees and about 30 degrees, or between about 10 degrees and about 20 degrees relative to the channel mount. As a result, the dual-hook attachment assembly 403 can be used to mount any or all wall panels 384, 386 (in addition to wall panels 364) to the trailer 312. The dual-hook attachment assembly 403 can provide easier positioning of the assemblies 362B, 362C relative to the cross-members 392 (i.e., front- or rear-flange mounting) and can maintain a fixed-angle mounting for maximum aerodynamic effect, as discussed above with respect to the rigid dual-hook mount bracket assembly 362A.

While the principles of the present disclosure have been depicted as being utilized with particular skirt assemblies or portions of particular skirt assemblies, the mount bracket assemblies described herein should not be limited to such skirt assemblies or portions of skirt assemblies. More particularly, the principles of the present disclosure may be utilized in conjunction with any skirts, skirt assemblies, or portions of skirt assemblies and any number of such mount bracket assemblies may be utilized.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, any of the features or functions of any of the embodiments disclosed herein may be incorporated into any of the other embodiments disclosed herein.

We claim:

1. A mount bracket assembly for a skirt system of a trailer, the mount bracket assembly comprising:
   a channel mount configured to be coupled to a portion of the skirt system; and
   an attachment assembly configured to be coupled to a flange of a cross-member of the trailer, the attachment assembly including:
   a top wall coupled to the channel mount, and
   a mounting bracket fixed to the top wall, the mounting bracket including two hook-shaped portions separated by a planar portion, wherein the two hook-shaped portions are each sized and configured to fit over the flange.

2. The mount bracket assembly of claim 1, wherein the mounting bracket is fixed at an angle with respect to the top wall, the angle being selected from the group consisting of 0 degrees, +13.8 degrees, and −13.8 degrees.

3. The mount bracket assembly of claim 2, wherein the mounting bracket is fixed by welding to the top wall.

4. The mount bracket assembly of claim 1, wherein the mounting bracket includes a first aperture and a second aperture, the top wall includes a third aperture and a fourth aperture, a first fastener is inserted through the first and third apertures, and a second fastener is inserted through the second and fourth apertures.

5. The mount bracket assembly of claim 4, wherein the fourth aperture is formed as an opening to allow the second fastener to be positioned at one of at least three locations within the opening to change an angle of the mount bracket assembly.

6. The mount bracket assembly of claim 5, wherein the opening provides for the angle to be between about 3 and about 30 degrees.

7. The mount bracket assembly of claim 1, further including a toe clamp positioned above the mounting bracket and configured to clamp a second flange of the cross-member.

8. The mount bracket assembly of claim 7, wherein the mounting bracket includes a first aperture and a second aperture, the top wall includes a third aperture and a fourth aperture, the toe clamp includes a fifth aperture and a sixth aperture, a first fastener is inserted through the first, third, and fifth apertures, and a second fastener is inserted through the second, fourth, and sixth apertures.

9. The mount bracket assembly of claim 8, further including an upper plate positioned above the toe clamp and further including seventh and eighth apertures through which the first and second fasteners extend, respectively.

10. The mount bracket assembly of claim 6, wherein the opening provides for the angle to be between about 10 and about 20 degrees.

11. The mount bracket assembly of claim 9, wherein the fasteners are bolts; and further comprising nuts configured to be tightened over each of the bolts to couple together the top wall, the mounting bracket, the toe clamp, and the upper plate.

\* \* \* \* \*